No. 787,815. PATENTED APR. 18, 1905.
A. J. ADAMS.
WHEEL.
APPLICATION FILED OCT. 8, 1904.

2 SHEETS—SHEET 1.

Witnesses:
Carl C. Gaylord
John Enders

Inventor:
Arthur J. Adams,
By Dyrenforth, Dyrenforth & Lee,
Att'ys

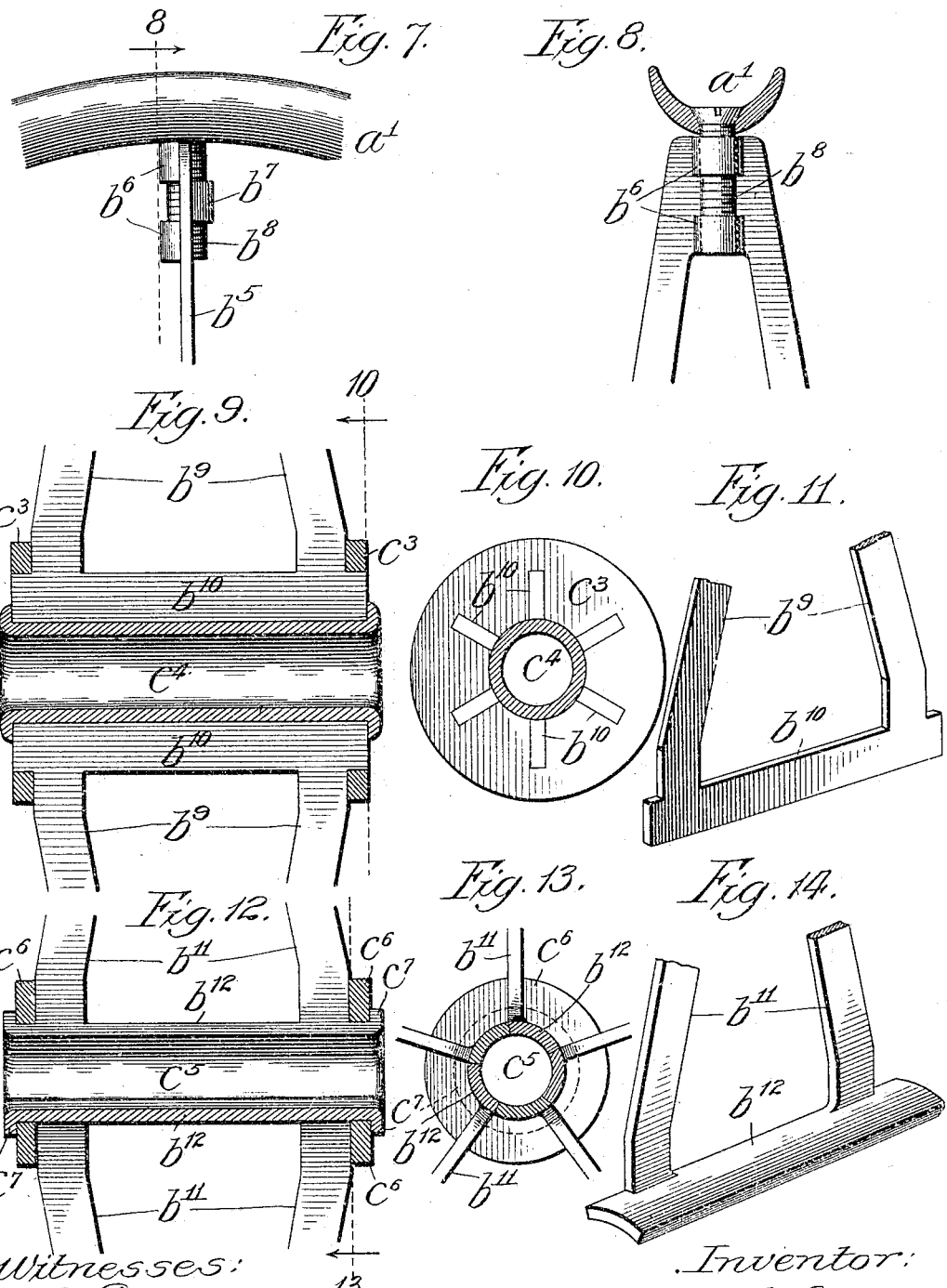

No. 787,815.     Patented April 18, 1905.

UNITED STATES PATENT OFFICE.

ARTHUR J. ADAMS, OF CHICAGO, ILLINOIS.

WHEEL.

SPECIFICATION forming part of Letters Patent No. 787,815, dated April 18, 1905.

Application filed October 8, 1904. Serial No. 227,700.

*To all whom it may concern:*

Be it known that I, ARTHUR J. ADAMS, a citizen of the United States, residing at Chicago, in the county of Cook and State of Illinois, have invented a new and useful Improvement in Wheels, of which the following is a specification.

My invention relates particularly to metallic wheels, such as are used on baby-carriages and children's vehicles; and my primary object is to provide such a wheel of greater durability and better finish than any wheel of moderate cost heretofore known.

My invention is illustrated in the accompanying drawings, in which—

Figure 1:
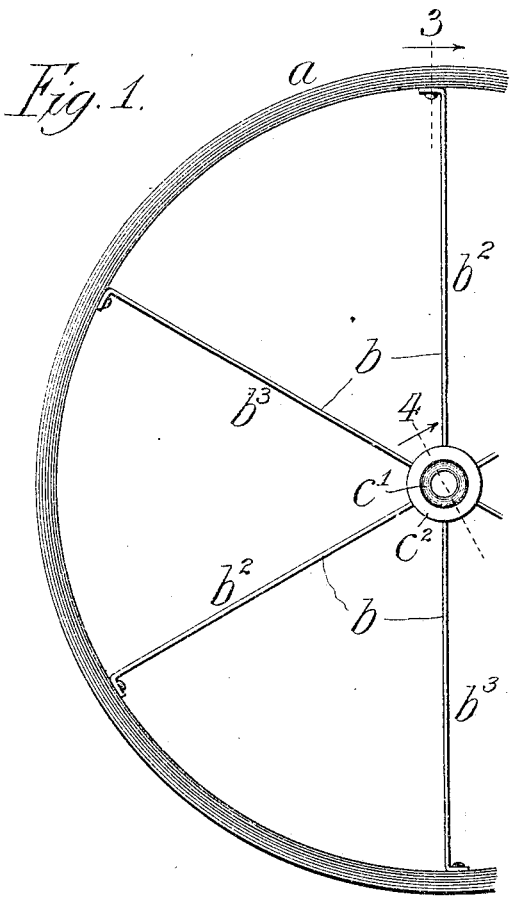
Figure 2:
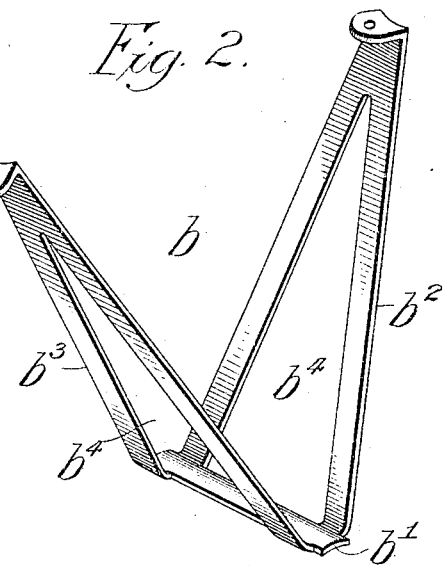
Figure 3:
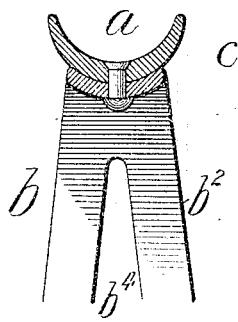
Figure 4:
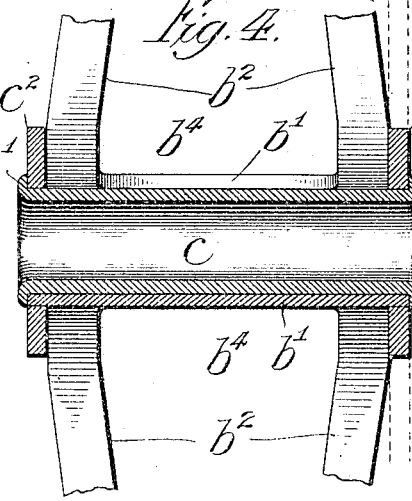
Figure 5:
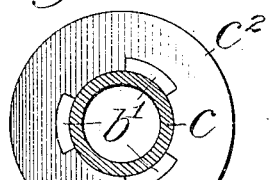
Figure 6:
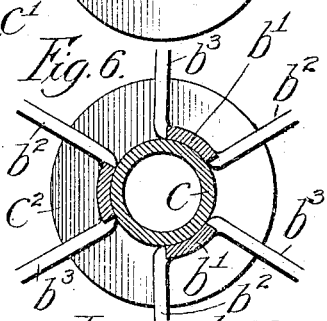

Figure 1 represents a broken side elevational view of one form of the improved wheel; Fig. 2, a perspective view of a steel stamping forming two spokes and a hub-section of the wheel shown in Fig. 1; Fig. 3, an enlarged broken section taken as indicated at line 3 of Fig. 1; Fig. 4, an enlarged broken section taken as indicated at line 4 of Fig. 1; Figs. 5 and 6, sections taken as indicated at the corresponding lines of Fig. 4; Fig. 7, a view illustrating a modification of the rim-attaching means; Fig. 8, a section taken as indicated at line 8 of Fig. 7; Fig. 9, a broken sectional view illustrating a modification of the hub construction; Fig. 10, a section taken as indicated at line 10 of Fig. 9; Fig. 11, a perspective view of the base portion of one of the spokes shown in Fig. 9; Fig. 12, a section showing another modification of the hub construction; Fig. 13, a section taken as indicated at line 13 of Fig. 12, and Fig. 14 a perspective view of the base portion of one of the spokes shown in Fig. 12.

In the construction shown in Figs. 1 to 6, inclusive, the wheel comprises a rim $a$, a plurality of sheet-metal stampings $b$, each forming a hub-section $b'$, and two spokes $b^2 b^3$, and $c$ a hub-tube having outwardly-spun flanges $c'$, serving to confine washers $c^2$, which in turn serve to bind the hub-sections $b'$ firmly upon the tube. Each spoke tapers from base to point and has a triangular opening $b^4$, whereby the spoke is lightened, the wide base serving, nevertheless, to effectually brace the rim against dishing. The hub-section $b'$ conforms in shape to the tube upon which it bears, and its ends project beyond the base portions of the spokes, forming tenons which fit into mortises or grooves at the inner circumferences of the washers, as clearly appears from Fig. 5. The spokes of any member $b$ form any desired angle, according to the number of spokes to the wheel. In the illustration six spokes are shown in three groups of two. Where all the parts are formed perfectly, a cheap and effective mode of attaching the rim is to bend the tips of the spokes at angles to the bodies thereof and join them to the rim by rivets, as shown.

In the modification of the rim attachment shown in Figs. 7 and 8 the metal is struck in two directions at the tip of the spoke $b^5$, forming two concavo-convex bosses $b^6$ on one side of the medium plane and a similar boss $b^7$ on the other side thereof. The radial passage thus formed is tapped and a screw $b^8$ employed to connect the rim. This construction does not require the same accuracy of parts as is required in the first-described construction.

In the hub construction shown in Figs. 9 to 11 the spokes $b^9$ are formed singly, and each spoke has its hub-section $b^{10}$ lying in the same plane as the spoke. The web portions $b^{10}$ have projecting ends forming flanges or tenons, which are received by radial recesses in the washers $c^3$, which thus serve to bind the spokes to the tube $c^4$.

In the hub construction shown in Figs. 12 to 14 the spokes $b^{11}$ are formed singly and have the webs $b^{12}$ at their bases of suitable size and shape to form a complete tube $c^5$. In this case the washers or rings $c^6$ fit over the projecting ends of the sectional tube $c^5$, and the ends of said tube are spun outwardly to form flanges $c^7$.

It is evident that in each construction shown an exceedingly strong and durable wheel is provided without the necessity of employing solder-joints, thus enabling the wheels to be neatly finished. Moreover, although the drawings do not serve to adequately convey this idea it is a fact that a wheel of very attractive design has been produced.

Obviously other changes in details of construction than those illustrated, all within the spirit of my invention, may be made. For instance, it may be feasible in some cases to omit the intermediate portions of the hub-sections formed integrally with the spokes or to provide other means than those shown for binding the hub-sections together. Particularly where lightness of construction is desired the entire interior metal of the base portions of the spokes may be cut away, the hub-tube being depended upon to connect the separated inclined portion of the spokes, as will be readily understood. Where two spokes are integrally formed, this would afford a very strong as well as a light construction.

It will be understood from the foregoing that no undue limitation is intended by the detailed description given above.

What I regard as new, and desire to secure by Letters Patent, is—

1. A wheel comprising a rim, spokes of sheet material having narrow tips joined directly to the rim and wide bases with outwardly-projecting tenons, and rings fitted and secured upon said tenons and binding the bases of the spokes together, the spokes having triangular openings extending from base to tip, whereby inclined mutually-bracing members are afforded extending from hub to rim, for the purpose set forth.

2. A wheel comprising a rim, sheet-metal members, each cut and bent to form a central hub portion and two spokes having narrow tips and wide bases with outwardly-projecting tenons at said bases, said tips being bent and joined directly to said rim, the spokes having triangular openings extending from tip to base and webs at the bases forming said hub portions, whereby inclined mutually-bracing and base-connected members extending from hub to rim are afforded, and rings fitted and secured upon said tenons, for the purpose set forth.

3. A wheel comprising a rim, sheet-metal members, each cut and bent to form a central hub portion and two spokes having narrow tips and wide bases with outwardly-projecting tenons at said bases, said tips being bent and joined directly to said rim, the spokes having triangular openings extending from tip to base and webs at the bases forming said hub portions, whereby inclined mutually-bracing and base-connected members extending from hub to rim are afforded, a hub-tube interposed between said hub portions of said first-named members, and rings fitted upon said tenons, said hub-tube having end flanges securing said rings, for the purpose set forth.

ARTHUR J. ADAMS.

In presence of—
WALTER N. WINBERG,
M. S. MACKENZIE.